United States Patent
Belpaire et al.

(10) Patent No.: US 9,962,884 B2
(45) Date of Patent: May 8, 2018

(54) PROCESS AND ARRANGEMENT FOR MAKING A REINFORCED STRUCTURAL MEMBER

(71) Applicant: SIKA TECHNOLOGY AG, Baar (CH)

(72) Inventors: Vincent Belpaire, Uccle (BE); Michael Meier, Niederrohrdorf (CH); Kurt Berli, Ottenbach (CH); Martin Wäger, Wettingen (CH)

(73) Assignee: SIKA TECHNOLOGY AG, Baar (CH)

( * ) Notice: Subject to any disclaimer, the term of this patent is extended or adjusted under 35 U.S.C. 154(b) by 27 days.

(21) Appl. No.: 14/767,845

(22) PCT Filed: Feb. 11, 2014

(86) PCT No.: PCT/EP2014/052607
§ 371 (c)(1),
(2) Date: Aug. 13, 2015

(87) PCT Pub. No.: WO2014/124924
PCT Pub. Date: Aug. 21, 2014

(65) Prior Publication Data
US 2015/0367562 A1 Dec. 24, 2015

(30) Foreign Application Priority Data
Sep. 10, 2015 (EP) .................................... 13155497

(51) Int. Cl.
*B29C 65/52* (2006.01)
*B29C 65/48* (2006.01)
(Continued)

(52) U.S. Cl.
CPC ........... *B29C 65/524* (2013.01); *B25J 9/1664* (2013.01); *B25J 9/1687* (2013.01);
(Continued)

(58) Field of Classification Search
CPC .............. B29C 65/524; B29C 65/4835; B29C 65/7841
See application file for complete search history.

(56) References Cited

U.S. PATENT DOCUMENTS 7,967,048 B2   6/2011   Yoshioka et al.
2003/0183327 A1  10/2003  Titze
(Continued)

FOREIGN PATENT DOCUMENTS

CN         1830662 A     9/2006
CN       101303995 A    11/2008
(Continued)

OTHER PUBLICATIONS

International Search Report and Written Opinion of the International Searching Authority for PCT/EP2014/052607 (in English), dated May 20, 2014; ISA/EP.
(Continued)

*Primary Examiner* — Daniel H Lee
(74) *Attorney, Agent, or Firm* — Oliff PLC

(57) ABSTRACT

Process for making a reinforced structural member, in particular forming part of an automobile or other vehicle or an aeroplane or a ship, the reinforced structural member comprising an original structural member and a reinforcing carrier and an adhesive bead and/or a plurality of adhesive plots arranged between an outer surface of the reinforcing carrier and a contact surface of the original structural member, for structurally bonding the reinforcing carrier to the original structural member.

21 Claims, 3 Drawing Sheets

(51) Int. Cl.
*B29C 65/78* (2006.01)
*C09J 5/00* (2006.01)
*B25J 9/16* (2006.01)
B29L 31/30 (2006.01)
B29C 65/00 (2006.01)
F16B 11/00 (2006.01)

(52) U.S. Cl.
CPC ...... *B29C 65/4835* (2013.01); *B29C 65/7841* (2013.01); *C09J 5/00* (2013.01); *B29C 66/301* (2013.01); *B29C 66/532* (2013.01); *B29C 66/61* (2013.01); *B29C 66/65* (2013.01); *B29L 2031/3044* (2013.01); *B29L 2031/3055* (2013.01); *B29L 2031/3067* (2013.01); *B29L 2031/3076* (2013.01); *C09J 2201/28* (2013.01); *F16B 11/006* (2013.01); *Y10S 901/02* (2013.01); *Y10T 156/10* (2015.01)

(56) References Cited

U.S. PATENT DOCUMENTS

| | | | |
|---|---|---|---|
| 2008/0277041 | A1 | 11/2008 | Yoshioka et al. |
| 2009/0038361 | A1* | 2/2009 | Toeniskoetter ...... B21D 39/021 72/214 |
| 2009/0220737 | A1 | 9/2009 | Kraushaar |
| 2010/0051183 | A1 | 3/2010 | Boke et al. |
| 2013/0056153 | A1* | 3/2013 | Czaplicki ........... C08G 59/4021 156/330 |

FOREIGN PATENT DOCUMENTS

| | | |
|---|---|---|
| DE | 10013224 A1 | 9/2001 |
| DE | 10-2008-039869 A1 | 3/2010 |
| EP | 1916269 A1 | 4/2008 |
| EP | 1916270 A1 | 4/2008 |
| EP | 1916272 A1 | 4/2008 |
| EP | 1946995 A1 | 7/2008 |
| EP | 1972646 A1 | 9/2008 |
| EP | 2084200 B1 | 12/2009 |
| EP | 2159109 A1 | 3/2010 |
| EP | 2251250 A1 | 11/2010 |
| EP | 2537642 A1 | 12/2012 |
| GB | 2446718 A | 8/2008 |
| JP | H07-214632 A | 8/1995 |
| JP | 2002047457 A | 2/2002 |
| JP | 2006-081955 A | 3/2006 |
| JP | 2006-341291 A | 12/2006 |
| JP | 2008-195277 A | 8/2008 |
| JP | 2009-226316 A | 10/2009 |
| JP | 2010-076417 A | 4/2010 |

OTHER PUBLICATIONS

Office Action (Notification of the First Office Action) dated Jul. 15, 2016, by the Chinese Patent Office in corresponding Chinese Patent Application No. 201480008830.7, and an English Translation of the Office Action. (20 pages).
Dec. 12, 2017 Office Action issued in Japanese Patent Application No. 2015-557398.
Mar. 27, 2018 Office Action issued in European Patent Application No. 14 705 995.0.

* cited by examiner

US 9,962,884 B2

PROCESS AND ARRANGEMENT FOR MAKING A REINFORCED STRUCTURAL MEMBER

CROSS REFERENCE TO RELATED APPLICATIONS

This application is a U.S. National Phase Application under 35 U.S.C. 371 of International Application No. PCT/EP2014/052607 filed on Feb. 11, 2014 and published in English as WO 2014/124924 A1 on Aug. 21, 2014. This application is based on and claims the benefit of priority from European Patent Application No. 13155497.4 filed on Feb. 15, 2013. The entire disclosures of all of the above applications are incorporated herein by reference.

TECHNICAL FIELD

The invention is related to a process for making a reinforced structural member, in particular forming part of an automobile or other vehicle or an aeroplane or a ship, the reinforced structural member comprising an original structural member. It also relates to an arrangement for carrying out such process.

STATE OF THE ART

Reinforcements provide structural support without a significant increase in cost and weight. For instance, reinforcements may be used in automobiles to reinforce cavities formed by various parts of the automobile such as a pillar, bumper, etc. To properly transfer loads from one side of the structure to the other, the reinforcement may have features that generally match the inner surfaces of the cavity in which the reinforcement is placed or a surface of a member to which it is attached.

Reinforcements may be provided with an adhesive or bonding material that secures the reinforcement within a given cavity or to the given structural member. Generally, such materials are provided on outer surfaces of the reinforcement in order to engage corresponding surfaces of the structural member to be reinforced. Reinforcements or systems of this type, respectively, are subject of several patents or patent applications of the applicant, e.g. EP 1 946 995 A1, US 2009/0220737 A1, EP 2 159 109 A1 or EP 2 251 250 A1. DE 10 2008 039 869 A1, US 2009/0038361 A1 and JP 2006 341291 describe processes for combining two structural members, wherein a plurality of machines and robots are used. In essence, the processes of DE 10 2008 039 869 A1, US 2009/0038361 A1 and JP 2006 341291 are regarded as being comparatively complex which involves an increased processing time and a low efficiency.

In industrial applications, a highly automatized process for making a reinforced structural member is needed, which allows for a high yield and low cost production of automobile or other vehicle parts and, at the same time, guarantee that the mechanical properties of the composite products cope with the quality standards in the respective fields.

DESCRIPTION OF THE INVENTION

This and other objects are solved by a process comprising the features of claim 1 and with an arrangement comprising the features of claim 13. Embodiments of the inventions are subject of the dependent claims.

One of the key aspects of the present invention lies in that the robot is operated so that the reinforcing carrier is pressed into the structural member in order to bond these two parts. In addition, the same robot is used within the step of applying the predetermined amount of adhesive. This means, the process is comparatively simple and time-efficient. For example in document DE 10 2008 039 869 A1, the pressing of different components is carried out, after the component being handled by the robot is removed from the robot.

It is preferred that the reinforcing carrier is moved by the robot along the adhesive dispense unit. This step may be executed simultaneously with a step of applying the at least one adhesive bead (at least in parts at the same time). In essence, the robot holds the reinforcing carrier whilst applying the adhesive bead, on the one hand, and whilst the step of pressing the reinforcing carrier into the (original) structural member, on the other hand. The reinforcing carrier is pressed into the (original) structural member, such that the (at least one) adhesive bead connects to predetermined locations on the contact surface of the structural member. Preferably, the adhesive bead subsequently spreads to form an adhesive layer, wherein the pressing is performed until the adhesive layer creates a mechanically sufficiently stable connection.

In a preferred embodiment, a bonding between the (original) structural member and the reinforcing carrier is realized (exclusively) via the pressing step. For example, a (sufficiently stable) connection is not based on a thermal treatment of the reinforcing carrier, the original structural member and/or the adhesive. Thereby, the robot is efficiently used to connect the original structural member with the reinforcing carrier.

Preferably, a bonding between original structural member and reinforcing carrier is such that the robot holding the reinforcing carrier is capable of picking up the original structural member via the reinforcing carrier. Thereby, the robot is also efficiently used to handle the structural member after connection of the original structural member with the reinforcing carrier. The robot (or any other apparatus) does not even need to directly contact the original structural member when carrying the original structural member. Such carrying may be executed (indirectly) via the reinforcing carrier (in particular via the adhesive bead/beads).

In general, the invention uses an adhesive (and not a sealant, as e.g. disclosed in the prior art) in order to securely connect the reinforcing carrier with the original structural member.

According to a general aspect of the invention, the process disclosed herein comprises bringing the reinforcing carrier, by correspondingly operating the robot, close to an adhesive dispense unit and moving the carrier, by correspondingly operating the robot, along the adhesive dispense unit according to a predetermined path, and, in timely correspondence to the movement of the carrier, discharging a predetermined amount of adhesive per time from the adhesive dispense unit, to apply the adhesive bead or beads and/or adhesive plots on predetermined locations on the outer surface on the reinforcing carrier. Herein the robot and the adhesive dispense unit are controlled such that the adhesive bead or beads or adhesive plots are formed in a predetermined shape. In an exemplary embodiment the process comprises controlling the robot and the dispense unit such that a constant amount of adhesive is applied along the predetermined path. In an other exemplary embodiment the robot and the dispense unit are controlled such that a variable amount of adhesive is applied along the predetermined path, such that the cross-section of the respective adhesive bead and/or adhesive plots varies according to a pre-defined geometric configuration of the adhesive bead and/or plurality of adhesive plots.

In a further exemplary embodiment, an adhesive dispense unit with a fixed nozzle connected to a dosing unit is used such that the locations on the reinforcing carrier or structural elements, where adhesive is applied, are exclusively controlled by the movements of the robot. In such embodiment, a basically static dispenser apparatus of a commercially available type can be used without significant modifications and, more specifically, without any specific drive and drive control means, thus contributing to low manufacturing cost.

In a further embodiment the process comprises providing the reinforcing carrier and/or the first structural element and/or the second structural element with a manipulation portion for robot manipulation. In such embodiment, a robot with standardized claws or other means for gripping parts to be moved can be used, without necessitating costly specific robot components for different reinforcer configuration or assembling environments. Such manipulation or handling portion, respectively, can be made within a mold injection step or step of foaming or pressing the reinforcing carrier, or it can be mounted to the carrier body in a subsequent step.

In a further embodiment, the reinforcing carrier is made by injection molding in an injection molding machine, and in particular the robot picks the reinforcing carrier at the output of the injection molding machine. In alternative embodiments, the reinforcing carrier can be made of plastic in a different process, e.g. an extrusion process, or a reinforcing carrier made from a different material can be used, e.g. made from compressed natural fibres or wood.

In further exemplary embodiments of the invention, the structural member is a multi-part member which comprises at least a first and second structural element. In such case, the process comprises moving the reinforcing carrier and the first structural element adhering thereto, by correspondingly operating the robot, to an assembling position. Subsequently, the robot is operated such that the first structural element provided with the adhesive bead or beads and/or adhesive plots is pressed against the second structural element which is waiting at the assembling position or operating the robot such that the first structural element is released at the assembling position, the robot is moved to a storage position where the second structural element waits, picking the second structural element and transferring it to the assembling position and pressing it against the first structural element provided with the adhesive bead or beads and/or adhesive plots. Herein, the pressing of the first structural element against the second structural element or vice versa is carried out such that the adhesive bead or beads or adhesive plots contact a surface of the second structural element in an uncured state and adhere to the second structural element. In embodiments adapted to a structural member which consist of three or more elements, the process steps are correspondingly adapted, in light of the intended total figuration of the structural member and, more specifically, its design with respect to the provision of adhesive bonds or mechanical connections between the several elements.

In a further embodiment, the process includes the step of applying a hot curing adhesive, preferably selected from the SikaPower® product family, to the reinforcing carrier, to form an adhesive bead and/or a plurality of adhesive plots on the reinforcing carrier, and the process is interrupted and resumed at a later time. Then, the assembled reinforced structural member is transferred to a curing location, in particular to a coat and paint oven, and kept therein for a predetermined period, for curing the adhesive bead or beads and/or adhesive plots. In principle, this transfer to the curing location can also be made immediately subsequent to the assembling step.

The SikaPower®-series typically comprise crash-resistant heat-curing one-component epoxy resin adhesives comprising a toughening agent based on a blocked polyurethane-prepolymer. Such adhesives which are herewith incorporated by reference are for example known from EP1916269, EP1916272, EP1916270, EP2084200 and EP1972646.

In another embodiment, a humidity-curing adhesive, e.g. selected from the SikaFlex® or SikaForce® product family, is applied to the reinforcing carrier immediately before assembling the reinforced structure member, without an unduly long delay between the adhesive application step and the assembling step.

Exemplary embodiments of the arrangement (i.e. system) according to the invention can be derived from the above-specified aspect of the process in a straightforward manner. Insofar, a repeated description appears to be avoidable. Nevertheless, we would like to point out that in embodiments of the arrangement a storage adapted for storing reinforcing carriers or an injection molding machine for providing reinforcing carriers in-line, wherein the robot is arranged and operable to pick the reinforcing carrier from the storage or the output of the injection molding machine.

In a further practically important embodiment wherein the adhesive dispense unit comprises a fixed nozzle. This fixed nozzle is preferably adapted to discharge a variable amount of adhesive per time, although this is not a necessary feature of the arrangement.

One of the advantages of the invention is that only one robot and one adhesive dispense unit are needed to perform the process. As a result thereof no further acquisition costs for additional machines or robots accumulate and less repair costs and downtime are to be expected.

Another advantage of the robot holding the reinforcing carrier during the whole process is that no handover of the reinforcing carrier to other machines is required. In particular during the application of the adhesive on the reinforcing carrier, the robot does not need to transfer the reinforcing carrier to the dispense unit. Thus, the programming of the robot and the dispense unit will be simpler.

Furthermore, the pressing step may be executed in such a way that a (substantial) force or pressure does not need to be exerted on either the reinforcing carrier or the original structural member and thus no deformation thereof occurs. Therefore, the robot does not require being high-powered which eventually reduces the acquisition costs for such a robot. The pressing step can also be described as setting or inserting the reinforcing carrier into the original structural member, wherein preferably the at least one adhesive is spread or squeezed in between to form at least one adhesive layer.

Moreover, there is also a beneficial effect if the pressing step is performed until the at least one adhesive layer creates a mechanically sufficiently stable connection. In such a case the processing time is reduced. The connection may be made as soon as the adhesive is spread, forms a layer and provides sufficient adhesion between the layer and both the original structural member and the reinforcing carrier. The cohesion of the adhesive allows picking up the original structural member adhering to the reinforcing carrier by picking up the reinforcing carrier. Thus, the adhesive is preferably configured to provide sufficient adhesive force in order to stick to said structural member and carrier and sufficient cohesive forces to ensure inner solidity. No or at least no complete curing of the adhesive layer is required at the pressing step. The mechanically sufficiently stable connection is preferably assumed to be established in the pressing step of the process according to at least one predetermined parameter (e.g. the robot moves and presses the reinforcing carrier into the original structural member).

DETAILED DESCRIPTION

Figure 1:
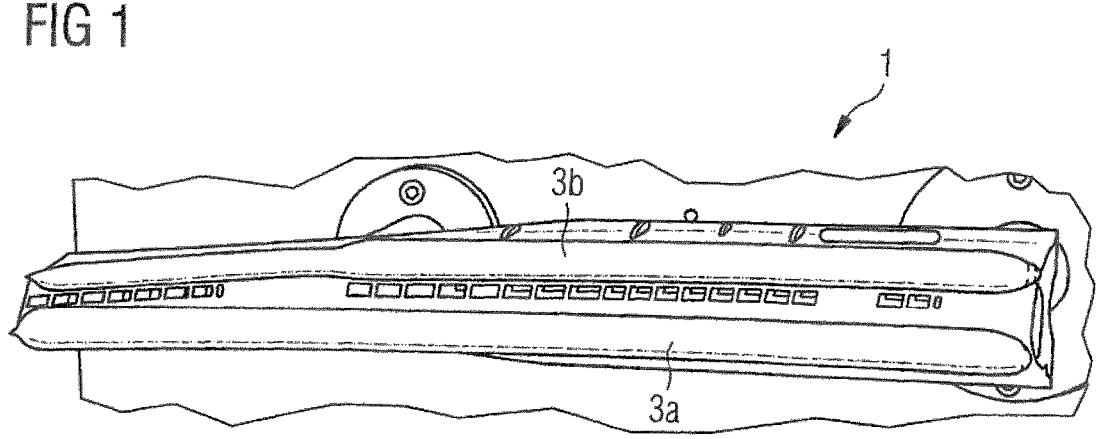
FIG. 1 illustrates, in a front view, a reinforcing carrier according to an embodiment of the invention.

FIG. 1 shows a reinforcing carrier 1 which has a lengthy body which is made from plastic and trough-shaped and comprises a first and second adhesive bead 3a, 3b which extend in parallel to each other and to the long edges of the body on the convex surface thereof. The beads 3a, 3b are made e.g. from a standard hot melt. Whereas the first bead 3a has constant cross sectional area along its extension, the second bead 3b has a variable cross sectional area, stepwise changing at about ⅔ of its extension.

Figure 2:
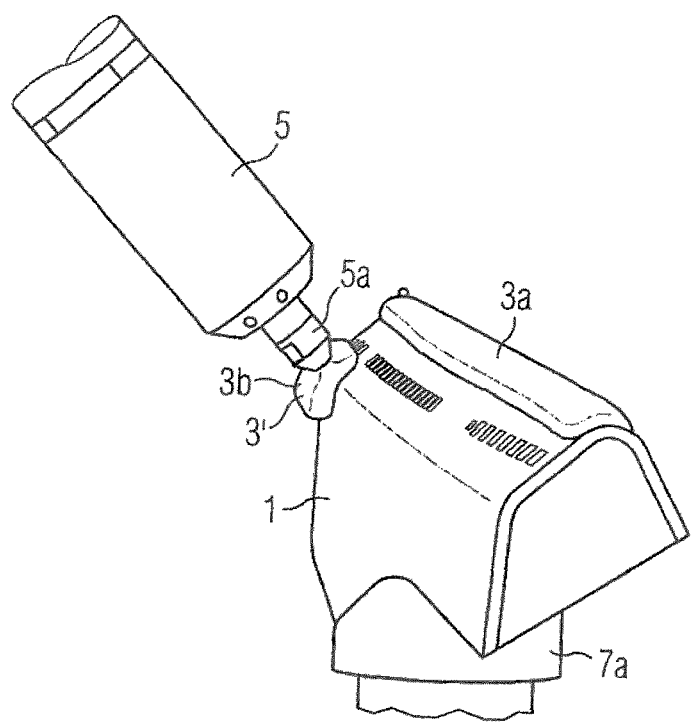
FIG. 2 illustrates the reinforcing carrier of FIG. 1 during the step of applying an adhesive bead thereto by means of an adhesive dispense unit.
Figure 3:
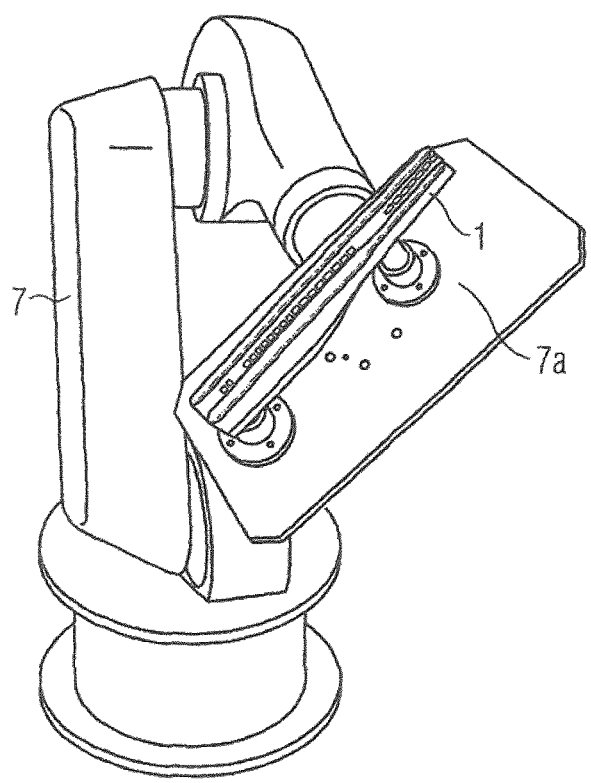
FIG. 3 illustrates the reinforcing carrier of FIG. 1 hold on a robot hand, in the step of transferring it between two work stations.

FIG. 2 illustrates how the adhesive beads 3a, 3b are applied to the surface of the reinforcing carrier 1 by means of discharging adhesive 3' from a nozzle 5a of an adhesive dispense unit 5, wherein the carrier 1 is supported by a robot hand 7a of an industrial robot (see FIG. 3). It is to be noted that the nozzle 5a of the adhesive dispense unit 5 is fixed and discharges a predetermined amount of adhesive per time, according to an adhesive discharge control signal, whereas the carrier 1 is moved along the end of the nozzle according to a robot operating control program.

FIG. 3 shows, in a perspective view, an industrial robot 7 holding the carrier 1 with the adhesive beads 3a, 3b applied thereto with its robot hand 7a during the transferral of the reinforcing carrier between two work stations, e.g. from the adhesive dispense work station to a reinforced structural member assembling station. The industrial robot 7 is of a standard type which provides for translational and rotational motions according to a control software which is adapted to the design of the reinforcing carrier and the beads applied thereon, as well as of the original structural member, and of the spatial arrangement of the several work stations which form the arrangement for carrying out the inventive process. Implementing the arrangement of the work stations and the corresponding robot control program is within the skills of one of ordinary skill in the art and does, therefore, not require more detailed explanations.

Figure 4A:
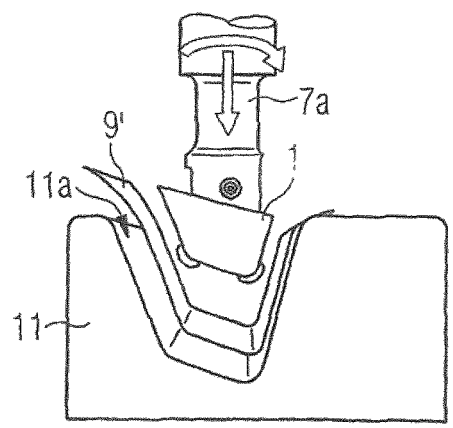
FIGS. 4A and 4B show, in side elevation views, the assembling of an original structural member and a reinforcing carrier to form a reinforced structural member.
Figure 4B:
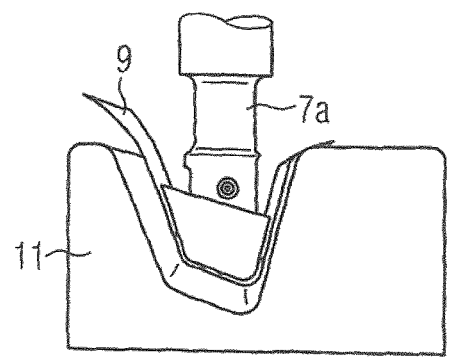

FIGS. 4A and 4B illustrate how a reinforced structural member 9 is assembled from an original structural member 9' and a reinforcing carrier 1, as illustrated in the preceding figures. The original structural member 9' is brought into a correspondingly shaped cavity 11a of an assembling block 11, and the reinforcing carrier 1 (with the adhesive beads applied thereto, not separate designated in this figure) is positioned above the concave surface of the member 9' (FIG. 4A) and pushed into it by a corresponding translational motion of the robot hand 7a (FIG. 4B).

This motion is controlled such that the adhesive beads come into contact with the surface of the member 9' and deformed into a continuous adhesive layer connecting the member 9' with the reinforcing carrier 1. The connection achieved herewith is mechanically sufficiently stable, to enable any further handling of the reinforced structural member 9 with the robot hand 7a, gripping the back surface of the reinforcing carrier 1.

In a practical implementation, the assembly block, which mainly serves for correctly positioning the original structural member, can be omitted and the member kept in place with other fixation means.

Figure 5:
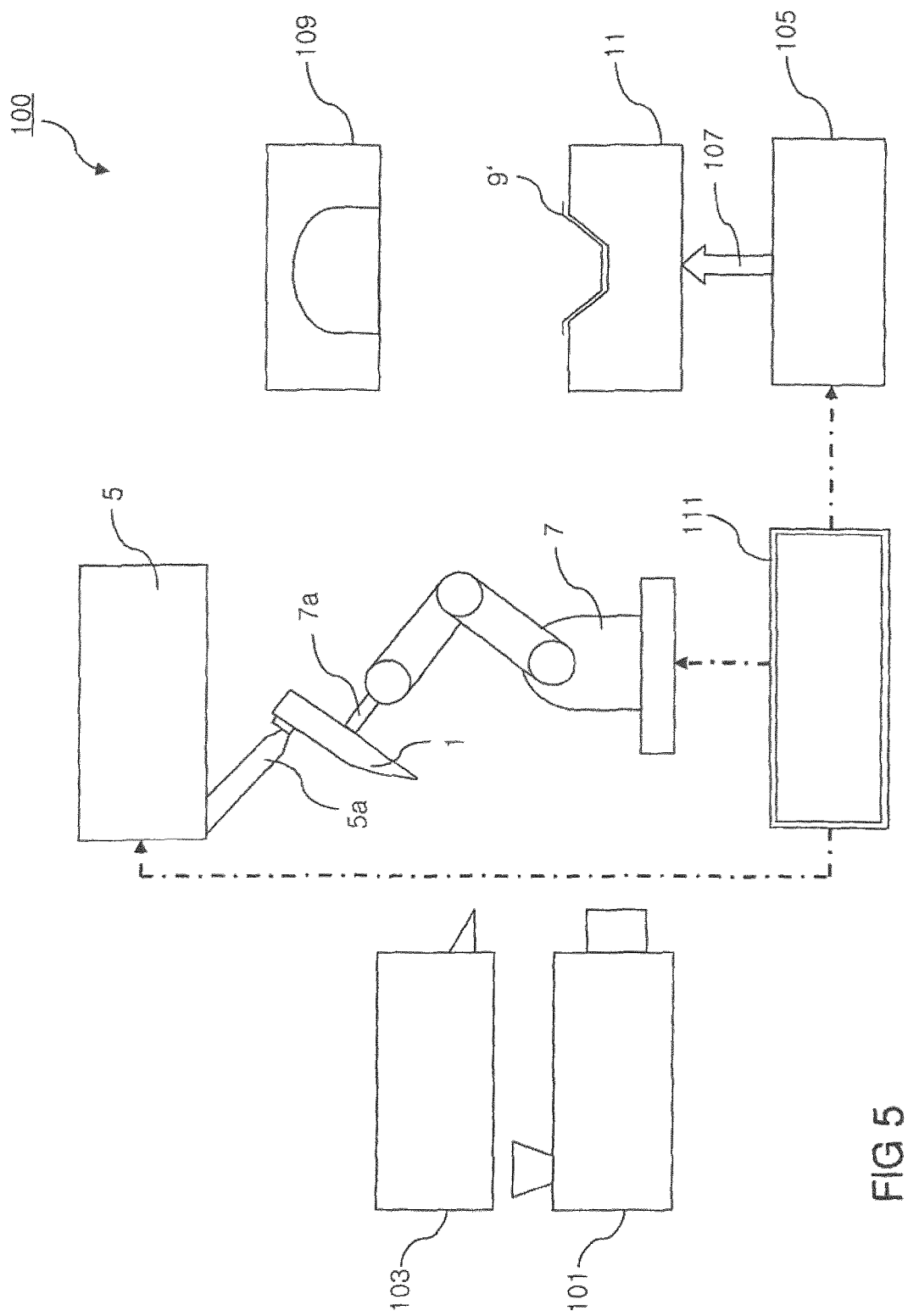
FIG. 5 is a schematic block diagram of an exemplary arrangement according to the invention.

FIG. 5 schematically illustrates an exemplary arrangement 100 for producing a reinforced structural member of the type explained above. The reference numerals of elements/devices which appear in one of the preceding figures are the same as in that figure.

In the arrangement 100, an injection molding machine 101 and in parallel a reinforcing carrier storage 103 are illustrated, as sources for providing the reinforcing carriers 1 used in the process. The robot 7 can take the reinforcing carriers either from the output of the injection molding machine 101 and from the output of the storage 103, i.e. it grasps in each cycle of the process, one carrier body at one of those outputs and moves it to the output of the nozzle 5a of the adhesive dispense unit 5. By moving the surface of the carrier 1 along the output of the nozzle and discharging adhesive from the nozzle, in one or plural adhesive dispense steps, the required number of adhesive beads on the carrier body, each with the required geometrical configuration, is provided.

Then, the robot 7 brings the completed reinforcing carrier from the dispense unit to the assembling block 11, where an original structural member 9' waits in the cavity 11a. The original structural members 9' are stored in a structural member storage 105 and transferred to the assembling block 11 by adequate transport means, in the figure symbolically illustrated as an arrow 107. The reinforced structural member is assembled in the assembling block 11 as explained further above and then, again by correspondingly operating the robot 7, transferred to a curing and paint oven 109, for curing the adhesive which provides the mechanical integrity of the reinforced structural member and, if adequate, for curing a paint applied to the reinforced structural member at the same time.

A robot and dispense unit operating control unit 111 is provided in the arrangement, for controlling the picking and releasing actions and movements of the robot 7, as well as the discharge of adhesive from the dispense unit 5. A control program stored within the control unit 111 accommodates a predetermined adhesive configuration relative to the respective surface of the reinforcing carrier 1, and the program also reflects the spatial arrangement of the several units of the arrangement relative to each other.

As a modification of the arrangement (not shown in the figure), an intermediate storage for storing the assembled reinforced structural members before transferring them to the oven 109 can be provided.

With regard to the process, system, methods, etc. described herein, it should be understood that, although the steps of such process, etc. have been described as occurring according to a certain ordered sequence, such processes could be practiced with the described steps performed in an order other than the order described herein. If further should be understood that certain steps could be performed simultaneously, that other steps could be added, or that certain steps described herein could be omitted. In other words, the descriptions of process herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a", "the", "said", etc. should be read to recite one or more of the indicated elements unless a claim recites an explicit limitation to the contrary.

LISTS OF REFERENCE NUMERALS 1 reinforcing carrier
3a, 3b adhesive bead
3' adhesive
5 adhesive dispense unit
5a nozzle
7 robot
7a robot hand
9 reinforced structural member
9' original structural member
11 assembling block
11a cavity
100 arrangement
101 injection molding machine
103 reinforcing carrier storage
105 structural member storage
107 transport means
109 curing and paint oven
111 robot and dispense unit operating control unit

The invention claimed is:

1. A process for making a reinforced structural member, which is configured to form part of an automobile or other vehicle or an airplane or a ship, the reinforced structural member comprising an original structural member and a non-metal reinforcing carrier and an adhesive bead or beads and/or a plurality of adhesive plots arranged between an outer surface of the non-metal reinforcing carrier and a contact surface of the original structural member, for structurally bonding the non-metal reinforcing carrier to the original structural member, the process comprising the steps:
  picking up the non-metal reinforcing carrier with a robot,
  bringing the non-metal reinforcing carrier, by correspondingly operating the robot, close to an adhesive dispense unit,
  moving the reinforcing carrier, by correspondingly operating the robot, along the adhesive dispense unit according to a predetermined path, and, in timely correspondence to the movement of the carrier, discharging a predetermined amount of adhesive per time from the adhesive dispense unit, to apply the adhesive bead or beads and/or adhesive plots on predetermined locations on the outer surface of the non-metal reinforcing carrier, thereby controlling the robot and the adhesive dispense unit such that the adhesive bead or beads and/or adhesive plots are formed in a predetermined shape,
  moving the non-metal reinforcing carrier, by correspondingly operating the robot, with the applied adhesive bead or beads and/or adhesive plots to the original structural member which is arranged in a working space,
  pressing, by correspondingly operating the robot, the non-metal reinforcing carrier into the original structural member such that the adhesive bead or beads and/or adhesive plots contact predetermined locations on the contact surface of the original structural member and adheres thereto to form an assembled reinforced structural member, and
  operating the robot to handle the assembled reinforced structural member and to release the non-metal reinforcing carrier and to return to a start position for picking a next reinforcing carrier and re-starting the process.

2. The process according to claim 1, wherein the bond between the original structural member and the non-metal reinforcing carrier is realized exclusively by the pressing step.

3. The process according to claim 1, wherein the bond between the original structural member and the non-metal reinforcing carrier formed during the pressing step is mechanically sufficiently stable such that the robot holding the reinforcing carrier can pick up the assembled reinforced structural member by gripping a back surface of the reinforcing carrier and without directly contacting the original structural member.

4. The process according to claim 1, wherein in the step of moving the reinforcing carrier along the adhesive dispense unit and applying the adhesive bead or beads and/or adhesive plots on the reinforcing carrier comprises controlling the robot and the dispense unit such that a constant amount of adhesive is applied along the predetermined path.

5. The process according to claim 1, wherein in the step of moving the reinforcing carrier along the adhesive dispense unit and applying the adhesive bead or beads and/or adhesive plots on the reinforcing carrier comprises controlling the robot and the dispense unit such that a variable amount of adhesive is applied along the predetermined path, such that the cross-section of the respective adhesive bead and/or adhesive plots varies according to a pre-defined geometric configuration of the adhesive bead and/or plurality of adhesive plots.

6. The process according to claim 1, wherein the original structural member comprises at least a first structural element and a second structural element, and the process comprises the steps:
  moving the reinforcing carrier provided with the adhesive bead or beads and/or adhesive plots to the first structural element and pressing the reinforcing carrier into the first structural element, by correspondingly operating the robot,
  moving the reinforcing carrier and the first structural element adhering thereto, by correspondingly operating the robot, to an assembling position, operating the robot such that the first structural element provided with the adhesive bead or beads and/or adhesive plots is pressed against the second structural element which is waiting at the assembling position or operating the robot such that the first structural element is released at the assembling position, the robot is moved to a storage position where the second structural element waits, picking the second structural element and transferring it to the assembling position and pressing it against the first structural element provided with the adhesive bead or beads and/or adhesive plots, wherein the pressing of the first structural element against the second structural element or vice versa is carried out such that the adhesive bead or beads and/or adhesive plots contact a surface of the second structural element in an uncured state and adhere to the second structural element.

7. The process according to claim 6, wherein the pressing of the reinforcing carrier provided with the adhesive bead or beads and/or adhesive plots against the original structural member or the first structural element and optionally the pressing of the first structural element against the second structural elements are effected in translational motions of the robot holding the reinforcing carrier or respective structural element, and/or wherein the pressing of the reinforcing carrier provided with the adhesive bead or beads and/or adhesive plots against the original structural member or the first structural member and optionally the pressing of the first structural element against the second structural element are effected by a means of combination of translational and rotational motions of the robot holding the reinforcing carrier or respective structural element.

8. The process according to claim 6, wherein by the pressing of the reinforcing carrier into the original structural member or the first structural element and optionally by the pressing of the first and second structural elements, provided with the adhesive bead or beads and/or adhesive plots, against each other, the lateral extension of the or each adhesive bead and/or adhesive plot is increased to form an adhesive layer.

9. The process according to claim 6, wherein an adhesive dispense unit with a fixed nozzle connected to a dosing unit is used such that the predetermined locations on the reinforcing carrier or first and second structural elements, where adhesive is applied, are exclusively controlled by the movements of the robot, and/or wherein a hot curing adhesive is used and after the step of applying adhesive to the reinforcing carrier, to form an adhesive bead and/or a plurality of adhesive plots on the reinforcing carrier, the process is interrupted and resumed at a later time.

10. The process according to claim 6, comprising providing the reinforcing carrier and/or the first structural element and/or the second structural element with a manipulation portion for robot manipulation.

11. The process according to claim 1, wherein the pressing of the reinforcing carrier provided with the adhesive bead or beads and/or adhesive plots against the original structural member is effected in translational motions of the robot holding the reinforcing carrier, and/or wherein the pressing of the reinforcing carrier provided with the adhesive bead or beads and/or adhesive plots against the original structural member is effected by a means of combination of translational and rotational motions of the robot holding the reinforcing carrier.

12. The process according to claim 1, wherein, by the pressing of the reinforcing carrier into the original structural member, the lateral extension of the or each adhesive bead and/or adhesive plot is increased to form an adhesive layer.

13. The process according to claim 1, wherein an adhesive dispense unit with a fixed nozzle connected to a dosing unit is used such that the predetermined locations on the reinforcing carrier, where adhesive is applied, are exclusively controlled by the movements of the robot, and/or wherein a hot curing adhesive is used and after the step of applying adhesive to the reinforcing carrier, to form an adhesive bead and/or a plurality of adhesive plots on the reinforcing carrier, the process is interrupted and resumed at a later time.

14. The process according to claim 1, wherein the non-metal reinforcing carrier is a plastic made by injection molding in an injection molding machine, and the robot picks the reinforcing carrier at the output of the injection molding machine.

15. The process according to claim 1, comprising providing the reinforcing carrier with a manipulation portion for robot manipulation.

16. The process according to claim 1, wherein the non-metal reinforcing carrier is a plastic reinforcing carrier.

17. The process according to claim 1, wherein the assembled reinforced structural member is transferred to a curing location and kept there for a predetermined period, for curing the adhesive bead or beads and/or adhesive plots.

18. The process according to claim 17, wherein the cured assembled reinforced structural member has a bond that is mechanically sufficiently stable such that the robot is capable of picking up the assembled reinforced structural member via the reinforcing carrier.

19. The process according to claim 18, wherein the curing location is a coat and paint oven, and the assembled reinforced structural member is kept therein for the predetermined period, for curing the adhesive bead or beads and/or adhesive plots.

20. The process according to claim 1, wherein the reinforcing carrier is trough-shaped, and wherein the step of pressing comprises pressing the trough-shaped reinforcing carrier into a complementary cavity of the original structural member.

21. The process according to claim 1, further comprising making the non-metal reinforcing carrier.

* * * * *